United States Patent Office 3,804,861
Patented Apr. 16, 1974

3,804,861
6-SUBSTITUTED-CHROMAN-8-CARBOXYLIC ACIDS
Haldor Christensen, Tastrup, Behrend Friedrich Lundt, Soborg, Frederik Christian Gronvald, Vedbaek and William Andersen, Lyngby, Denmark, assignors to Novo Terapeutisk Laboratorium A/S, Bagsvaerd, Denmark
No Drawing. Continuation-in-part of application Ser. No. 33,864, May 1, 1970. This application Dec. 4, 1972, Ser. No. 311,811
Int. Cl. C07d 7/32
U.S. Cl. 260—345.2     4 Claims

ABSTRACT OF THE DISCLOSURE

The invention process novel chroman-8-carboxylic acids of the formula:

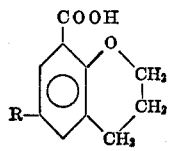

in which R is bromine, chlorine, methyl or methoxy.

These carboxylic acids are useful as intermediates in the production of physiologically active compounds. They are particularly useful in the production of antidiabetic benzenesulfonylurea and benzenesulfonylsemicarbazide derivatives.

---

This application is a continuation-in-part of our copending application U.S. S.N. 33,864, filed on May 1, 1970.

The present invention relates to novel chroman-8-carboxylic acids of the general formula:

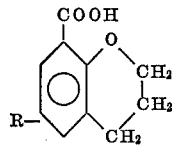

in which R is bromine, chlorine, methyl or methoxy.

Only two closely related carboxylic acids have been reported previously: chroman-8-carboxylic acid [Yakugaku Zasshi, 81, 453–7 (1961)] and 2,2-dimethylchroman-8-carboxylic acid [Bull. Soc. Chim. Belg. 61, 33–43 (1952)]. However, no commercial uses of these acids are known.

The novel 6 - substituted - chroman - 8 - carboxylic acids of the general Formula I are most conveniently prepared from the corresponding 5-substituted salicyclic esters (II) in the following manner:

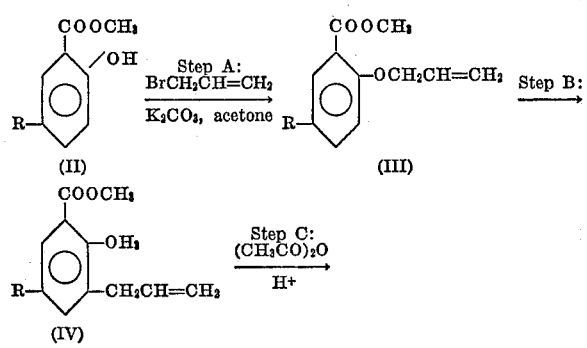

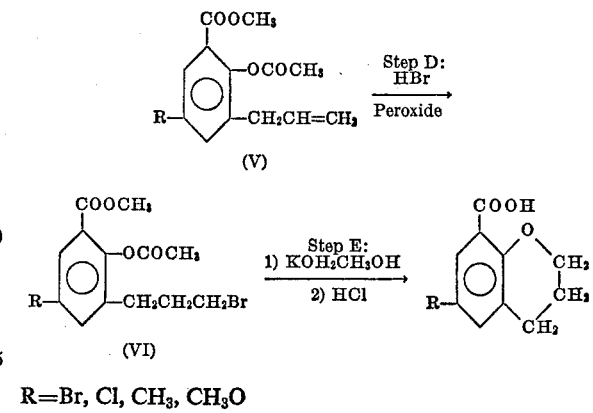

R=Br, Cl, $CH_3$, $CH_3O$

Step A is a conventional and well established ether synthesis in which high yields are readily obtained.

Step B is the exothermic Claisen-rearrangement which is preferably performed at 200° to 220° C. using N-methyl-2-pyrrolidone as solvent and a reaction time of 3 to 10 hours depending mostly on the temperature used. This method gives high yields of rearranged Compounds IV of high purity. The work-up consists in a vacuum-fractionation during which the solvent is also recovered in a quality which permits its reuse in the next batch.

Step C is a conventional acetylation of the phenolic group which is performed by prolonged refluxing with excess acetic anhydride in the presence of a trace of a strong acid as for example p-toluenesulfonic acid. High yields are also obtained in this step.

Step D is the anti-Markovnikov addition of hydrogen bromide to the double bond which is performed at a temperature around 0° C. in carbon tetrachloride in the presence of a peroxide as for example benzoyl peroxide. After saturation with hydrogen bromide gas the mixture is left standing overnight after which the solvent as well as excess hydrogen bromide are removed by vacuum stripping. The residue which consists almost entirely of the desired halide (VI) is conveniently used in the next step without further purification.

Step E is the combined ring-closure and saponification step which is advantageously performed in methanol using potassium hydroxide as the base. The reactants are mixed at 25 to 30° C. and then refluxed for 30 minutes. Most of the methanol is then stripped off after which the residue is dissolved in water and the resulting solution is acidified. High yields of the crude acids are thus obtained and these acids are easily purified by recrystallization.

We have found the novel 6-substituted-chroman-8-carboxylic acids of the general Formula I to be particularly advantageous as starting materials for the production of antidiabetic benzenesulfonylurea and benzenesulfonylsemicarbazide derivatives as for example the following two compounds:

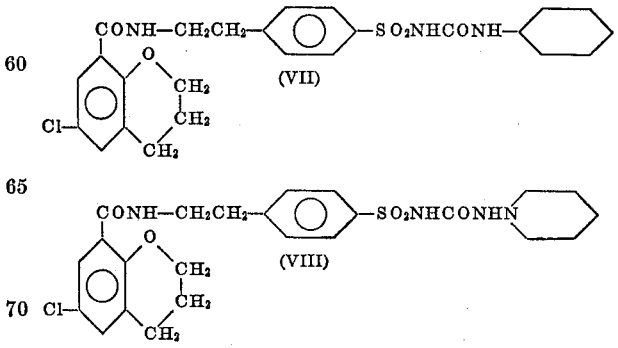

In the production of such benzenesulfonylurea and benzenesulfonylsemicarbazide compounds the 6-chlorochroman-8-carboxylic acid, chosen here to illustrate this utility, is first converted to its acid chloride, which is then reacted with 4 - (2-aminoethyl)-benzenesulfonamide to form 4-(2-(6-chlorochroman-8-carboxamido)-ethyl)-benzenesulfonamide (IX):

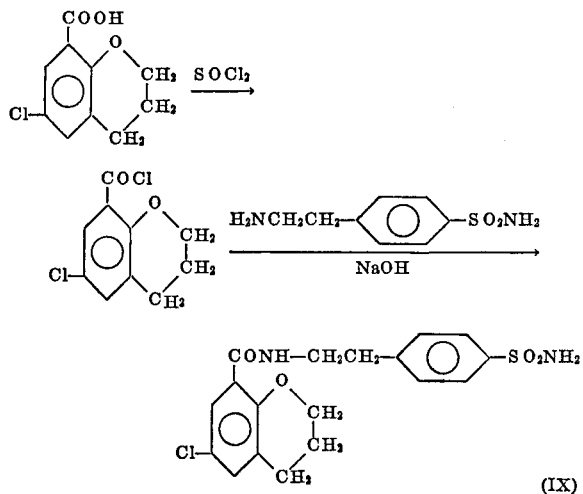

This sulfonamide (IX) may then be converted to the benzenesulfonylurea derivative (VII) shown above through reaction with cyclohexyl isocyanate, or it may similarly be converted to the benzenesulfonylsemicarbazide derivative (VIII) shown above, through reaction with the following intermediate:

Benzenesulfonylurea derivatives prepared from the 6-substituted-chroman-8-carboxylic acids of the present invention are described in our copending application U.S. S.N. 33,864, filed on May 1, 1970.

Benzenesulfonylsemicarbazide derivatives prepared from the 6-substituted-chroman-8-carboxylic acids of the present invention are described in co-pending application U.S. S.N. 151,971 filed on June 10, 1971, now abandoned.

The following examples illustrate the details of the invention.

EXAMPLE 1

6-methylchroman-8-carboxylic acid (a) Methyl - 2-allyloxy-5-methylbenzoate: 429 g. of methyl-5-methylsalicyclate, 356 g. of anhydrous powdered potassium carbonate, 430 ml. of acetone and 312 g. of allyl bromide are mixed and stirred with reflux for 24 hours. Approximately 400 ml. of acetone is then distilled off and the residue is cooled to 20° C. 1200 ml. of water is added and the desired material is extracted with 245 ml. of toluene. The toluene solution is dried over anhydrous sodium sulfate and the toluene is then distilled off. The residue is fractionated in vacuum to yield 396 g. (74%) of methyl-2-allyloxy-5-methylbenzoate, B.P. (10 mm. Hg)=152–154° C.

(b) Methyl-3-allyl-5-methylsalicylate: 396 g. of methyl-2-allyloxy-5-methylbenzoate and 396 g. of N-methyl-2-pyrrolidone are refluxed in a nitrogen atmosphere for 3 hours and then cooled to 40° C. Fractionation in vacuum yields 342 g. (86%) of 3-allyl-5-methylsalicylate, B.P. (11 mm. Hg)=142–144° C.

(c) Methyl-3-allyl-5-methyl-acetylsalicylate: 247 g. of methyl-3-allyl-5-methylsalicylate, 0.4 g. of p-toluenesulfonic acid and 264 ml. of acetic anhydride are mixed and stirred with reflux for 19 hours. The solution is cooled to 25° C. and 700 ml. of water is added. The mixture is then extracted twice with toluene (300 ml.+150 ml.) and the combined toluene layers are dried over anhydrous sodium sulfate. Toluene is then distilled off in vacuum and and the residue is fractionated in vacuum to yield 253 g. (85%) of methyl-3-allyl-5-methylacetylsalicylate, B.P. (0.8 mm. Hg)=123–125° C.

(d) 6-methylchroman-8-carboxylic acid: Dry hydrogen bromide gas (approximately 110 g.) is bubbled through a mixture of 149 g. of methyl-3-allyl-5-methylacetylsalicylate, 3.5 g. of benzylperoxide and 410 ml. of carbon tetrachloride at −5° C. to 0° C. Stirring is continued at this temperature for additional 3 hours after the hydrogen bromide saturation and the mixture is then left standing at approximately 0° C. overnight. The carbon tetrachloride and excess hydrogen bromide are stripped off in vacuum and the residue (174 g.) is dissolved in 200 ml. of methanol. This solution is added dropwise to a solution of 118 g. of potassium hydroxide in 250 ml. of methanol while the temperature is maintained at 25° C. to 30° C. during the addition. Stirring is continued at this temperature for additional 30 minutes after which the mixture is refluxed for one hour and finally is cooled to room temperature. Methanol is now distilled off in vacuum and the residue is dissolved in 400 ml. of water. The solution is filtered and is then added with stirring to a mixture of 185 ml. of concentrated hydrochloric acid (37%) and 300 g. of crushed ice. The crystals are filtered off, washed with water and then dried. The yield of crude acid is 105 g. (91%), M.P. 118–121° C. Recrystallization from 315 ml. of n-butyl acetate yields 81 g. (77% recovery) of pure 6-methylchroman-8-carboxylic acid, M.P. 122–123° C.

EXAMPLE 2

6-chlorochroman-8-carboxylic acid

Using methyl-5-chlorosalicylate as starting material and proceeding through the same steps as in Example 1 there is prepared:

(a) Methyl-2-allyloxy-5-chlorobenzoate, B.P. (0.2 mm. Hg)=96–98° C., M.P. 30.5° C., (b) Methyl-3-allyl-5-chlorosalicylate, B.P. (0.4 mm. Hg)=104–105° C., (c) Methyl-3-allyl-5-chloro-acetylsalicylate, M.P. 48–50° C. (n-hexane), and (d) 6-chlorochroman-8-carboxylic acid, M.P. 159–160° C. (xylene).

EXAMPLE 3

6-methoxychroman-8-carboxylic acid

Using methyl-5-methoxysalicylate as starting material and proceeding through the same steps as in Example 1 there is prepared:

(a) Methyl-2-allyloxy - 5 - methoxybenzoate, B.P. (0.9 mm. Hg)=123–126° C., M.P. 42–43° C. (hexane), (b) Methyl-3-allyl-5-methoxysalicylate B.P. (0.9 mm. Hg)=114–117° C., (c) Methyl-3-allyl-5-methoxy-acetylsalicylate, B.P. (0.4 mm. Hg)=129–130° C., and (d) Methoxychroman-8-carboxylic acid, M.P. 109–110° C. (isopropyl alcohol).

EXAMPLE 4

6-bromochroman-8-carboxylic acid

Using methyl-5-bromosalicylate as starting material and proceeding through the same steps as in Example 1 there is prepared:

(a) Methyl-3-allyloxy-5-bromobenzoate, B.P. (0.4 mm. Hg)=103–104° C., M.P. 31–32° C. (hexane), (b) Methyl-3-allyl-5-bromosalicylate, B.P. (0.3 mm. Hg)=98–99° C., (c) Methyl-3-allyl-5-bromo-acetylsalicylate, M.P. 66–67° C. (hexane), and
(d) 6-bromochroman-8-carboxylic acid, M.P. 167–168° C. (n-butyl acetate).

What we claim is:
1. 6-methylchroman-8-carboxylic acid.
2. 6-chlorochroman-8-carboxylic acid.
3. 6-methoxychroman-8-carboxylic acid.
4. 6-bromochroman-8-carboxylic acid.

References Cited

Yakugaku Zasshi, vol. 81, pp. 453–7 (1961).
Bull. Soc. Chem., Belg., vol. 61, pp. 33–43 (1952).

JOHN M. FORD, Primary Examiner

U.S. Cl. X.R.

260—999; 424—283

UNITED STATES PATENT OFFICE
CERTIFICATE OF CORRECTION

Patent No. 3,804,861          Dated April 16, 1974

Inventor(s) Haldor Christensen, Behrend Friedrich Lundt, Frederik Christian Gronvald and William Andersen It is certified that error appears in the above-identified patent and that said Letters Patent are hereby corrected as shown below:

Column 1, line 17, in Structure IV:

"$OH_3$" should read --OH--

Column 2, line 21:

Before "exothermic" insert --highly--

Signed and sealed this 4th day of March 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

Patent No. 3,804,861      Dated April 16, 1974

Inventor(s) Haldor Christensen, Behrend Friedrich Lundt, Frederik Christian Gronvald and William Andersen It is certified that error appears in the above-identified patent and that said Letters Patent are hereby corrected as shown below:

In the masthead, column 1, between lines 10 and 11 insert the following:

--Claims priority, application Great Britain, May 9, 1969, 23888/69; application Great Britain, August 27, 1969, 42763/69; and application Great Britain, November 24, 1969, 57434/69--

Signed and Sealed this

Fourteenth Day of December 1976

[SEAL]

Attest:

RUTH C. MASON  
Attesting Officer

C. MARSHALL DANN  
Commissioner of Patents and Trademarks